United States Patent
Yu et al.

(10) Patent No.: US 9,793,535 B2
(45) Date of Patent: Oct. 17, 2017

(54) ELECTRODE STRUCTURE INCLUDING INSULATING LAYER, MANUFACTURING METHOD THEREOF, AND ELECTROCHEMICAL DEVICE INCLUDING THE ELECTRODE

(71) Applicant: LG CHEM, LTD., Seoul (KR)

(72) Inventors: In-Gyoung Yu, Daejeon (KR); Seok-Koo Kim, Daejeon (KR); Jang-Hyuk Hong, Daejeon (KR); Sun-Mi Jin, Daejeon (KR); Jong-Hun Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 263 days.

(21) Appl. No.: 14/430,487

(22) PCT Filed: May 8, 2014

(86) PCT No.: PCT/KR2014/004110
§ 371 (c)(1),
(2) Date: Mar. 23, 2015

(87) PCT Pub. No.: WO2014/182095
PCT Pub. Date: Nov. 13, 2014

(65) Prior Publication Data
US 2015/0243964 A1 Aug. 27, 2015

(30) Foreign Application Priority Data
May 8, 2013 (KR) .................. 10-2013-0052077

(51) Int. Cl.
*H01M 10/0562* (2010.01)
*H01M 4/04* (2006.01)
(Continued)

(52) U.S. Cl.
CPC ......... *H01M 4/0404* (2013.01); *H01M 4/043* (2013.01); *H01M 4/0471* (2013.01);
(Continued)

(58) Field of Classification Search
CPC .. H01M 4/0404; H01M 4/0471; H01M 4/622; H01M 4/587; H01M 4/043;
(Continued)

(56) References Cited

U.S. PATENT DOCUMENTS

| | | | |
|---|---|---|---|
| 4,824,746 A | 4/1989 | Belanger et al. | |
| 2002/0170168 A1* | 11/2002 | Gonzalez | H01M 4/0407 29/623.5 |

(Continued)

FOREIGN PATENT DOCUMENTS

| | | | |
|---|---|---|---|
| JP | H5-129021 A | 5/1993 | |
| JP | 2004-47439 A | 2/2004 | |

(Continued)

OTHER PUBLICATIONS

International Search Report, issued in PCT/KR2014/004110, dated Sep. 29, 2014.

*Primary Examiner* — Lisa S Park
(74) *Attorney, Agent, or Firm* — Birch, Stewart, Kolasch & Birch, LLP

(57) ABSTRACT

Disclosed is a method for manufacturing an electrode structure including (S1) coating and drying a slurry for an electrode active material layer on an electrode current collector placed on a heated bottom surface, (S2) coating and drying a slurry for an insulating layer including inorganic particles, a binder, and a solvent, on a heated roller located at a predetermined distance from the bottom surface, and (S3) transferring the dried slurry for an insulating layer to the dried slurry for an electrode active material layer on the bottom surface, and thermo-compressing the dried slurry for
(Continued)

an insulating layer and the dried slurry for an electrode active material layer, to form an insulating layer on an electrode surface.

15 Claims, 5 Drawing Sheets

(51) Int. Cl.
| | |
|---|---|
| *H01M 4/139* | (2010.01) |
| *H01M 4/131* | (2010.01) |
| *H01M 4/133* | (2010.01) |
| *H01M 4/1391* | (2010.01) |
| *H01M 4/1393* | (2010.01) |
| *H01M 4/525* | (2010.01) |
| *H01M 4/587* | (2010.01) |
| *H01M 4/62* | (2006.01) |
| *H01M 4/66* | (2006.01) |
| *H01M 10/0567* | (2010.01) |
| *H01M 10/0569* | (2010.01) |
| *H01M 4/02* | (2006.01) |

(52) U.S. Cl.
CPC .......... *H01M 4/131* (2013.01); *H01M 4/133* (2013.01); *H01M 4/139* (2013.01); *H01M 4/1391* (2013.01); *H01M 4/1393* (2013.01); *H01M 4/525* (2013.01); *H01M 4/587* (2013.01); *H01M 4/622* (2013.01); *H01M 4/625* (2013.01); *H01M 4/661* (2013.01); *H01M 10/0567* (2013.01); *H01M 10/0569* (2013.01); *H01M 2004/027* (2013.01); *H01M 2004/028* (2013.01); *H01M 2220/20* (2013.01); *H01M 2220/30* (2013.01); *H01M 2300/004* (2013.01)

(58) Field of Classification Search
CPC ............... H01M 4/1391; H01M 4/525; H01M 10/0567; H01M 4/661; H01M 4/131; H01M 4/1393; H01M 4/133; H01M 10/0569; H01M 4/625; H01M 4/139
See application file for complete search history.

(56) References Cited

U.S. PATENT DOCUMENTS

| | | | |
|---|---|---|---|
| 2003/0215704 A1 | 11/2003 | Satsuma et al. | |
| 2005/0064289 A1* | 3/2005 | Suzuki ............... | H01M 4/0404 429/209 |
| 2005/0266150 A1 | 12/2005 | Yong et al. | |
| 2006/0046149 A1 | 3/2006 | Yong et al. | |
| 2006/0248710 A1* | 11/2006 | Fukumoto ........... | H01M 4/0414 29/623.5 |
| 2011/0159362 A1* | 6/2011 | Wakizaki ............. | H01G 9/02 429/209 |
| 2012/0141877 A1 | 6/2012 | Choi et al. | |
| 2012/0219841 A1* | 8/2012 | Bolandi ............... | C23C 26/00 429/144 |
| 2014/0011116 A1 | 1/2014 | Ozawa | |
| 2014/0099538 A1* | 4/2014 | Johnson ............... | H01M 4/13 429/211 |

FOREIGN PATENT DOCUMENTS

| | | |
|---|---|---|
| JP | 2008-91192 A | 4/2008 |
| JP | 2010-34218 A | 2/2010 |
| KR | 10-2006-0012598 A | 2/2006 |
| KR | 10-2011-0063437 A | 6/2011 |
| WO | WO 2012/124518 A1 | 9/2012 |

* cited by examiner

ELECTRODE STRUCTURE INCLUDING INSULATING LAYER, MANUFACTURING METHOD THEREOF, AND ELECTROCHEMICAL DEVICE INCLUDING THE ELECTRODE

TECHNICAL FIELD

The present disclosure relates to an electrode structure for improving performance and safety of an electrochemical device, and more particularly, to an electrode structure having a coating layer as a substitute for a separator and a manufacturing method thereof, and an electrochemical device including the electrode structure.

The present application claims priority to Korean Patent Application No. 10-2013-0052077 filed in the Republic of Korea on May 8, 2013, the disclosures of which are incorporated herein by reference.

BACKGROUND ART

Recently, there has been growing interest in energy storage technologies. As the application fields of energy storage technologies have been extended to mobile phones, camcorders, laptop computers and even electric cars, efforts have increasingly been made towards the research and development of electrochemical devices. In this aspect, electrochemical devices have attracted the most attention. Among them, the development of rechargeable secondary batteries has been the focus of particular interest. In recent years, extensive research and development has been conducted to design new electrodes and batteries for the purpose of improving capacity density and specific energy of the batteries.

Among currently available secondary batteries, lithium ion secondary batteries developed in the early 1990's have received a great deal of attention due to their advantages of higher operating voltages and much higher energy densities than traditional batteries using aqueous electrolyte solutions, such as Ni-MH batteries, Ni—Cd batteries, $H_2SO_4$—Pb batteries, and the like. However, such lithium secondary batteries have disadvantages of safety-related problems caused by the use of organic electrolyte solutions, for example, ignition and explosion, and complex manufacturing.

Such electrochemical devices are produced by many companies, but their safety characteristics show different aspects from each other. Assessing and ensuring the safety of electrochemical devices is important. One of the most important considerations is that electrochemical devices should not cause damage to users in the event of malfunction, and for this purpose, Safety Standards impose strict regulations on ignition and explosion of electrochemical devices. In the safety characteristics of electrochemical devices, electrochemical devices have a high risk of explosion in the event of overheat or thermal runaway of an electrochemical device or penetration of a separator.

Particularly, a polyolefin-based separator commonly used as a separator of an electrochemical device has a drawback of thermal contraction to an original size at high temperature due to characteristics of a separator material, for example, characteristics of polyolefins that generally melt at temperature equal to or less than 200° C., and processing characteristics, for example, characteristics that pass through a stretching process to adjust the pore size and porosity. Thus, when a battery increases in temperature by internal/external stimulation, there is a high likelihood for a short circuit between a cathode and an anode due to shrinkage or melting of a separator, and as a result, the battery has a high risk of explosion due to emission of electrical energy.

Accordingly, to solve the problem of a polyolefin-based separator, there is a need for technology development for a material capable of improving performance and safety of an electrochemical device as well as serving as a separator.

DISCLOSURE

Technical Problem

The present disclosure is designed to solve the above problem, and an insulating layer made from inorganic particles and a binder is formed on a surface of at least one of a cathode and an anode. In this instance, after a slurry for an insulating layer is dried, the slurry for an insulating layer is transferred and thermo-compressed to a dried slurry for an electrode active material layer, to manufacture an electrode structure, so that a manufacturing process of the electrode structure may be simplified and a battery stability problem may be solved, and the present disclosure is directed to providing a method for manufacturing such an electrode structure.

Technical Solution

To achieve the above object, the present disclosure provides a method for manufacturing an electrode structure, including (S1) coating and drying a slurry for an electrode active material layer on an electrode current collector placed on a heated bottom surface, (S2) coating and drying a slurry for an insulating layer including inorganic particles, a binder, and a solvent, on a heated roller located at a predetermined distance from the bottom surface, and (S3) transferring the dried slurry for an insulating layer to the dried slurry for an electrode active material layer on the bottom surface, and thermo-compressing the dried slurry for an insulating layer and the dried slurry for an electrode active material layer, to form an insulating layer on an electrode surface.

According to an exemplary embodiment of the present disclosure, when thermo-compressing the dried slurry for an insulating layer and the dried slurry for an electrode active material layer, a porous substrate may be interposed between the dried slurry for an insulating layer and the dried slurry for an electrode active material layer.

According to another exemplary embodiment of the present disclosure, a temperature of the heated bottom surface may be from 40 to 200° C., and a temperature of the heated roll may be from 40 to 200° C. Also, a distance between the heated bottom surface and the heated roller may be from 0.01 to 10 mm. Also, a pressing condition for the thermo-compression may be from 1 to 500 kgf/cm².

According to another exemplary embodiment of the present disclosure, the bottom surface may be a shape of a belt connected to a transfer means.

According to another exemplary embodiment of the present disclosure, the solvent may be any one solvent selected from the group consisting of acetone, tetrahydrofuran, methylene chloride, chloroform, dimethylformamide, dimethylacetamide, hexamethylphosphoamide, acetonitrile, cyclohexanone, N-methyl-2-pyrrolidone (NMP), cyclohexane, and water (distilled water), or mixtures thereof.

According to another exemplary embodiment of the present disclosure, the binder may be any one binder polymer selected from the group consisting of polyvinylidene fluoride-co-hexafluoropropylene, polyvinylidene fluoride-co-trichloroethylene, polymethylmethacrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose (CMC), and styrene-butadiene rubber (SBR), or mixtures thereof.

According to another exemplary embodiment of the present disclosure, a thickness of the thermo-compressed insulating layer may be from 1 to 100 μm.

Also, an average grain diameter of the inorganic particles may be from 0.001 to 10 μm, and a weight ratio of the inorganic particles and the binder polymer may be from 50:50 to 99:1.

According to another exemplary embodiment of the present disclosure, a thickness of the thermo-compressed electrode active material layer may be from 0.5 to 200 μm.

Also, according to another aspect of the present disclosure, there is provided an electrode structure manufactured by the manufacturing method. In this instance, when the electrode active material is a cathode active material, the electrode structure is a cathode structure, and when the electrode active material is an anode active material, the electrode structure is an anode structure.

Accordingly, the electrode structure may be an electrode structure including an electrode current collector, an electrode active material layer disposed on the current collector, and an insulating layer disposed on the electrode active material layer and formed from a slurry for an insulating layer including inorganic particles, a binder, and a solvent, wherein an adhesive strength between the electrode active material layer and the insulating layer is from 0.5 gf/mm to 100 gf/mm, and the electrode active material layer and the insulating layer are integrally formed.

Also, according to another aspect of the present disclosure, there is provided an electrochemical device including a cathode, an anode, and an electrolyte solution, wherein the at least one of the cathode and the anode is the electrode structure manufactured by the manufacturing method, and the electrochemical device may be a lithium secondary battery.

Advantageous Effects

According to the manufacturing method of the present disclosure, coating, drying, and rolling of the electrode active material layer and the insulating layer is not separately performed, and after drying, thermo-compression of the electrode active material layer and the insulating layer is performed at the same time, so an electrode forming process may be simplified. Also, a pore structure is formed by the integrated connection of the electrode active material layer and the insulating layer, and stronger structural stability may be achieved by improved binding of the electrode active material layer and the insulating layer, and besides, high dimensional stability even at temperature equal to or higher than 200° C. may be achieved. Also, wettability in an electrolyte solution is much higher than a traditional porous polyolefin-based separator, and concerns about shrinkage and melting of a porous olefin separator may be eliminated and stability may be improved.

BRIEF DESCRIPTION OF THE DRAWINGS

The accompanying drawing illustrates a preferred embodiment of the present disclosure and together with the foregoing disclosure, serves to provide further understanding of the technical spirit of the present disclosure, and thus, the present disclosure is not construed as being limited to the drawing.

MODE FOR CARRYING OUT THE INVENTION

Hereinafter, the present disclosure will be described in detail. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

The present disclosure relates to a method for manufacturing an electrode structure, in which the electrode structure includes an insulating layer and an electrode active material layer and has improved adhesion of the two layers, and the manufacturing method according to the present disclosure includes:

(S1) coating and drying a slurry for an electrode active material layer on an electrode current collector placed on a heated bottom surface;

(S2) coating and drying a slurry for an insulating layer including inorganic particles, a binder, and a solvent, on a heated roller located at a predetermined distance from the bottom surface; and (S3) transferring the dried slurry for an insulating layer to the dried slurry for an electrode active material layer on the bottom surface, and thermo-compressing the dried slurry for an insulating layer and the dried slurry for an electrode active material layer.

Figure 1:
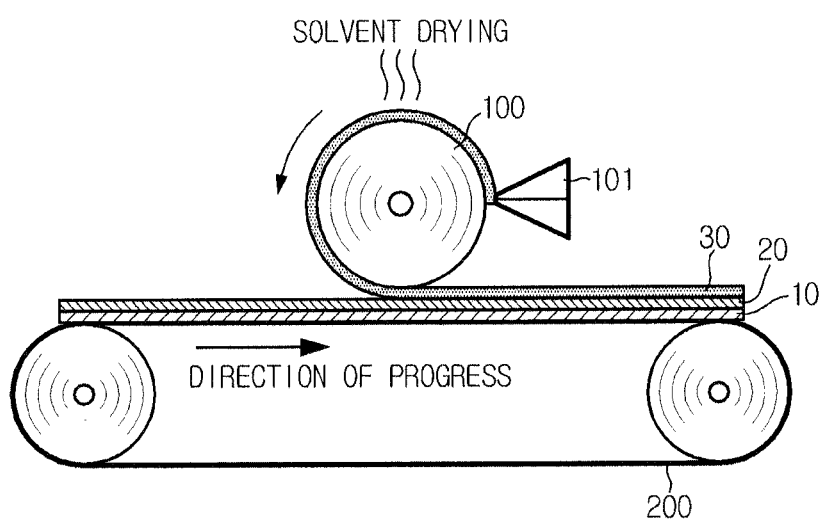
FIG. 1 is a diagram illustrating a method of thermo-compressing an insulating layer according to an exemplary embodiment of the present disclosure.
Figure 2:
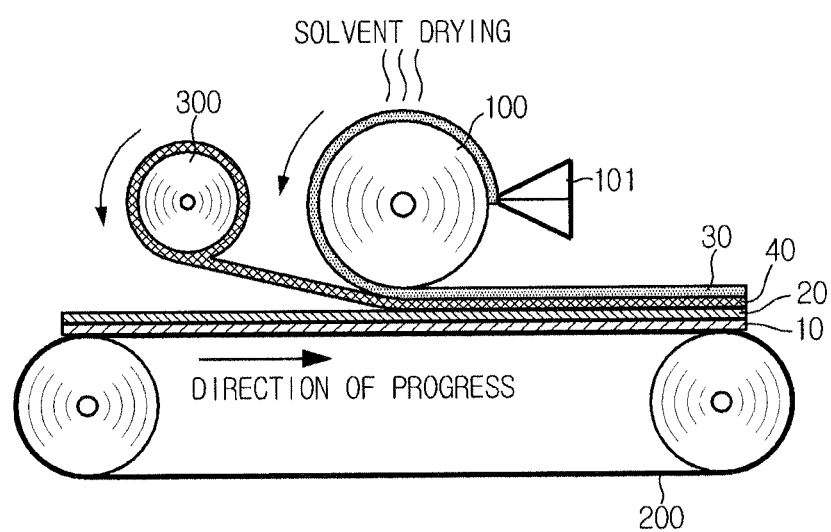
FIG. 2 is a diagram illustrating a method of thermo-compressing an insulating layer according to another exemplary embodiment of the present disclosure.

FIGS. 1 and 2 are schematic diagrams illustrating the manufacturing method according to the present disclosure and correspond to one of the exemplary embodiments, and the present disclosure is not limited thereto. Referring to FIG. 1, an electrode current collector 10 is placed on a heated bottom surface 200, and a slurry 20 for an electrode active material layer is coated on the electrode current collector 10. The bottom surface 200 represents a portion of a belt connected by a transfer means, namely, a roller. The coated slurry 20 for an electrode active material layer is dried on the electrode current collector by the heat of the bottom surface. Also, a slurry 30 for an insulating layer is coated on the surface of the heated roller 100 through a slot of a slot die 101 and dried by the heat of the roller. In this instance, the heated roller 100 is located at a predetermined distance from the bottom surface 200. Subsequently, by the rolling of the heated roller 100 and the bottom surface 200, the dried slurry dry product for an insulating layer is transferred onto the dried slurry dry product for an electrode active material layer placed on the bottom surface 200, and the two dried slurry dry product layers are thermo-compressed.

Alternatively, referring to FIG. 2, similar to FIG. 1, but in the transfer and thermo-compression of the electrode active material layer and the insulating layer, transfer and thermo-compression may be performed with a porous substrate 40, to be exact, a porous polymer substrate interposed between the two layers.

The porous polymer substrate is a porous polymer film substrate or a porous polymer non-woven fabric substrate, and as the porous polymer film substrate, a porous polymer film made from polyolefin such as polyethylene and polypropylene may be used, and in addition to polyolefin, the porous polymer film substrate may be manufactured using polymers such as polyester. Also, for the porous polymer non-woven fabric substrate, for example, polyethylene terephthalate (PET) may be used, and the present disclosure is not limited thereto.

As the slurry for an electrode active material layer is dried on the heated bottom surface, the slurry for an electrode active material layer is dried by the heated roller, and subsequently, the two dried slurry dry product layers are thermo-compressed, an electrode including the insulating layer manufactured by the manufacturing method according to the present disclosure may provide a dense insulating layer that has increased adhesion between the electrode active material layer and the insulating layer, consequently reduced interfacial resistance, and ameliorates the mechanical property problem such as chipping. Also, high dimensional stability may be ensured even at temperature higher than or equal to 200° C., and an electrode assembly process may be simplified by integrating transfer and compression simultaneously.

Also, because the insulating layer formed on the electrode of the present disclosure not only prevents a short circuit of the cathode and the anode, but also has an electrolyte transfer capability by the pore structure, as in the electrode structure manufactured by the method according to FIG. 1, the porous substrate, specifically, a polyolefin layer-free separator may replace an existing separator. Alternatively, as in the electrode structure presented by the method according to FIG. 2, the porous substrate may be further included between the electrode active material layer and the insulating layer.

The temperature of the heated bottom surface may be from 40 to 200° C., the temperature of the heated roller may be from 40 to 200° C., and the temperature range may be adjusted based on the thermal properties of the binder included in each slurry layer. Within the temperature range, an extent to which each slurry layer is dried and the two layers are thermo-compressed may be adjusted. Also, a distance between the heated bottom surface and the heated roller may be from 0.01 to 10 mm, and the distance may be adjusted based on mechanical or physical properties of the binder and the particles included in each slurry layer. Within the distance range, an extent to which the two layers are thermo-compressed may be adjusted. That is, a stable electrode structure may be manufactured by adjusting a thermo-compression strength through adjustment of the temperature of the roller and the bottom surface and the distance between the roller and the bottom surface.

That is, in the thermo-compression, it is preferred to adjust a pressing condition to a range of 1 to 500 kgf/cm$^2$.

A detailed description of a method for manufacturing the electrode structure including the insulating layer according to the present disclosure is provided as follows.

First, a slurry for an electrode active material layer is coated on an electrode current collector placed on a heated bottom surface, and the coated slurry for an electrode active material layer is dried by the heat of the bottom surface.

The bottom surface is a belt connected by a transfer means, more specifically, a transfer roller, and the electrode current collector is placed on the belt, and in thermo-compression, the belt may move with the heated roller.

The electrode current collector may include any electrode current collector being commonly used, and in case in which the electrode is used as a cathode, for the cathode current collector, a foil made from aluminum, nickel, or a combination thereof may be used, and is not limited thereto. In case in which the electrode is used as an anode, a foil made from copper, gold, nickel or copper alloy or combinations thereof may be used, and is not limited thereto.

The slurry for an electrode active material layer may include an electrode active material, a binder, and a solvent, and if necessary, a conductive material and other additive may be further included. The electrode active material may include any electrode active material being commonly used, and in case in which the electrode is used as a cathode, for a cathode current collector, a foil made from aluminum, nickel, or a combination thereof may be used, and is not limited thereto. In case in which the electrode is used as a cathode, lithium manganese oxide, lithium cobalt oxide, lithium nickel oxide, lithium iron oxide, or lithium composite oxides thereof may be used, and is not limited thereto. Also, in case in which the electrode is used as an anode, lithium adsorption material such as a lithium metal or a lithium alloy, carbon, petroleum coke, activated carbon, graphite or other carbons, or a non-carbon material such as a metal and a metal alloy may be used, and is not limited thereto.

The binder included in the slurry for an electrode active material layer may be any one binder polymer selected from the group consisting of polyvinylidene fluoride-co-hexafluoropropylene, polyvinylidene fluoride-co-trichloroethylene, polymethylmethacrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose (CMC), and styrene-butadiene rubber (SBR), or mixtures thereof.

Also, the solvent included in the slurry for an electrode active material layer represents a solvent capable of dissolving the binder polymer. As the solvent, a solvent having a similar solubility parameter to that of the binder polymer intended to use and a low boiling point is preferred. This is for facilitating the uniform mixing and subsequent solvent removal. Non-limiting examples of available first solvents may include any one solvent selected from the group consisting of acetone, tetrahydrofuran, methylene chloride, chloroform, dimethylformamide, dimethylacetamide, hexamethylphosphoamide, acetonitrile, cyclohexanone, N-methyl-2-pyrrolidone (NMP), cyclohexane, and water (distilled water), or mixtures thereof.

Subsequently, a slurry for an insulating layer including inorganic particles, a binder, and a solvent is coated on a heated roller located at a distance from the bottom surface, and the insulating layer slurry is dried by the heat of the roller (S2).

The slurry for an insulating layer may include the inorganic particles, the binder, and the solvent, and if necessary, may further include other additive.

The inorganic particles included in the slurry for an insulating layer are not particularly limited if they are electrochemically stable. That is, the inorganic particles that may be used in the present disclosure are not particularly limited if they do not cause oxidation and/or reduction reactions in an operating voltage range (for example, from 0 to 5V for Li/Li$^+$) of an electrochemical device to be applied. In particular, when inorganic particles having a high dielectric constant are used as the inorganic particles, such inorganic particles may contribute to the increase in the degree of dissociation of an electrolyte salt, for example, a lithium salt, in a liquid electrolyte and may improve ionic conductivity of an electrolyte solution.

For these reasons, the inorganic particles preferably include inorganic particles having a high dielectric constant greater than or equal to 5, preferably, greater than or equal to 10. Non-limiting examples of the inorganic particles having the dielectric constant greater than or equal to 5 include $BaTiO_3$, $Pb(Zr,Ti)O_3$(PZT), $Pb_{1-x}La_xZr_{1-y}Ti_yO_3$ (PLZT, $0<x<1$, $0<y<1$), $Pb(Mg_{1/3}Nb_{2/3})O_3$—$PbTiO_3$ (PMN-PT), hafnia ($HfO_2$), $SrTiO_3$, $SnO_2$, $CeO_2$, $MgO$, $NiO$, $CaO$, $ZnO$, $ZrO_2$, $Y_2O_3$, $Al_2O_3$, $TiO_2$, $SiC$, or their mixtures.

Also, as the inorganic particles, inorganic particles capable of transporting lithium ions, that is, inorganic particles that contain lithium atoms and have a function of transferring a lithium ion without storing lithium, may be used. Non-limiting examples of the inorganic particles capable of transporting lithium ions include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), (LiAlTiP)$_xO_y$ based glass ($0<x<4$, $0<y<13$) such as $14Li_2O$-$9Al_2O_3$-$38TiO_2$-$39P_2O_5$, lithium lanthanum titanate ($Li_xLa_yTiO_3$, $0<x<2$, $0<y<3$), lithium germanium thiophosphate ($Li_xLa_yTiO_3$, $0<x<4$, $0<y<1$, $0<z<1$, $0<w<5$) such as $Li_{3.25}Ge_{0.25}P_{0.75}S_4$, lithium nitride ($Li_xN_y$, $0<x<4$, $0<y<2$) such as $Li_3N$, $SiS_2$ based glass ($Li_xSi_yS_z$, $0<x<3$, $0<y<2$, $0<z<4$) such as $Li_3PO_4$—$Li_2S$—$SiS_2$, $P_2S_5$ based glass ($Li_xP_yS_z$, $0<x<3$, $0<y<3$, $0<z<7$) such as $LiI$—$Li_2S$—$P_2S_5$, or mixtures thereof.

Also, an average grain diameter of the inorganic particles is not particularly limited, however, to form a coating layer of a uniform thickness and maintain a proper porosity, a range of 0.001 to 10 μm is preferred. When the average grain diameter of the inorganic particles is within the range, dispersibility deterioration may be prevented, and an increase in thickness of the coating layer may be prevented.

Preferably, as the binder polymer included in the slurry for an insulating layer, polymer having a glass transition temperature (Tg) in a range of −200 to 200° C. may be used, which may improve the mechanical properties of a finally formed insulating layer such as flexibility and elasticity.

Also, the binder polymer does not necessarily need to have an ion conduction ability, but when polymer having an ion conduction ability is used, performance of an electrochemical device may be further improved. Accordingly, a binder polymer having a high dielectric constant as possible is preferred. Actually, because a degree of dissociation of salts in an electrolyte solution relies on a dielectric constant of an electrolyte solvent, as the dielectric constant of the binder polymer increases, the degree of dissociation of salts in the electrolyte may be improved. The dielectric constant of the binder polymer may be in a range of 1.0 to 100 (measured at frequency of 1 kHz), in particular, preferably, higher than or equal to 10.

In addition to the above functions, the binder polymer may have a feature that exhibits a high degree of swelling in a liquid electrolyte solution because the binder polymer is gelled when immersed in the electrolyte solution. Accordingly, it is preferred to use polymer having a solubility parameter in a range of 15 to 45 $MPa^{1/2}$, more preferably, in a range of 15 to 25 $MPa^{1/2}$ and 30 to 45 $MPa^{1/2}$. Thus, it is preferred to use hydrophilic polymers having more polar groups rather than hydrophobic polymers such as polyolefins. When the solubility parameter is lower than 15 $MPa^{1/2}$ and higher than 45 $MPa^{1/2}$, swelling in a common liquid electrolyte solution for a battery may be difficult.

Non-limiting examples of the binder polymer may include any one binder polymer selected form the group consisting of polyvinylidene fluoride-co-hexafluoropropylene, polyvinylidene fluoride-co-trichloroethylene, polymethylmethacrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose (CMC) and styrene-butadiene rubber (SBR), or mixtures thereof.

The weight ratio of the inorganic particles and the binder polymer included in the slurry for an insulating layer may be, for example, in a range of 50:50 to 99:1, and in a range of 70:30 to 95:5. When the weight ratio of the inorganic particles to the second binder polymer is less than 50:50, because the polymer content is high, an insulating layer to be formed may reduce in pore size and porosity. When the content of the inorganic particles is higher than 99 parts by weight, a coating layer to be formed may degrade in peeling resistance because of a low content of the binder polymer.

In the present disclosure, the solvent included in the slurry for an insulating layer represents a solvent capable of dissolving the binder polymer included in the slurry for an insulating layer. As the solvent, a solvent having a similar solubility parameter to that of the binder polymer intended to use and a low boiling point is preferred. This is for facilitating the uniform mixing and subsequent solvent removal. Non-limiting examples of available solvents may include acetone, tetrahydrofuran, methylene chloride, chloroform, dimethylformamide, N-methyl-2-pyrrolidone (NMP), cyclohexane, water (distilled water), or mixtures thereof.

In this instance, an order in which S1 and S2 are performed may be reversed.

Subsequently, the dried slurry for an insulating layer is transferred onto the dried slurry for an electrode active material layer on the bottom surface, and the dried slurry dry product for an insulating layer and the dried slurry dry product for an electrode active material layer are thermo-compressed (S3).

By thermo-compressing the dried slurry dry product for an electrode active material layer and the dried slurry dry product for an insulating layer simultaneously, adhesion of the electrode active material layer and the insulating layer may increase and a denser insulating layer may be formed, contributing to improvements in cell performance and safety. Also, the electrode structure may be formed by a simpler process.

In the thermo-compression, a compression strength may be adjusted by adjusting the temperature of the bottom surface and the roller and a distance of the bottom surface and the roller.

The thermo-compressed electrode active material layer may be 0.5 to 200 µm thick. Within the range, the electrode active material may perform a function in accordance with the purpose of use.

Also, the thermo-compressed insulating layer may be 1 to 100 µm thick. When the thickness of the insulating layer is within the range, uniform coating of the insulating layer may be made, and as coated on the electrode active material layer, the insulating layer may perform its function; when the inorganic particles are packed and come into contact with each other, the insulating layer binds the inorganic particles to each other by the binder polymer to form interstitial volumes among the inorganic particles, and the interstitial volumes among the inorganic particles become void to form pores.

Also, the present disclosure provides an electrode structure manufactured by the manufacturing method.

Also, the present disclosure provides an electrochemical device including a cathode, an anode, and an electrolyte solution, wherein the electrode manufactured by the manufacturing method according to the present disclosure is used as either the cathode or the anode, or both. The electrochemical device has the insulating layer formed on the surface of the electrode, which may replace an existing separator.

The electrochemical device includes any device that causes an electrochemical reaction, as a specific example, all types of primary and secondary batteries, fuel cells, solar cells, or capacitors.

Figure 3:
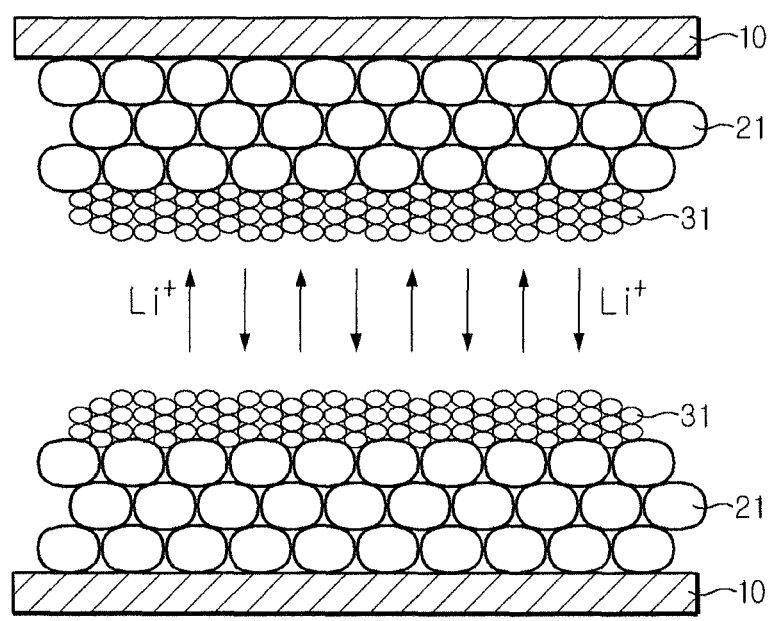
FIG. 3 is a diagram schematically illustrating the case in which an electrode structure including an insulating layer according to the present disclosure is applied to a battery.

FIG. 3 is a schematic diagram illustrating a secondary battery in which the electrode including the insulating layer according to the present disclosure is introduced, and an electrochemical device is not limited thereto. Referring to FIG. 3, one of the two electrodes serves as a cathode and the other serves as an anode, and a lithium secondary battery works by movement of lithium between the cathode and the anode. More specifically, the electrode is an electrode including an electrode current collector 10, an electrode active material layer including an electrode active material 21 disposed on one surface of the electrode current collector 10, and an insulating layer including inorganic particles 31 disposed on one surface of the electrode active material layer, and one electrode serves as a cathode and the other serves as an anode, and a lithium secondary battery works by movement of lithium between the cathode and the anode.

According to an exemplary embodiment of a method for manufacturing an electrochemical device using the electrode manufactured as described in the foregoing, the electrochemical device may be manufactured by assembling using only the electrode having the coating layer manufactured as described in the foregoing, without using a general polyolefin-based microporous separator, through a process such as winding or stacking, and pouring an electrolyte solution.

The electrolyte solution that may be used in the present disclosure may be an electrolyte solution in which a salt is dissolved or dissociated in an organic solvent, the salt having a structure represented by, for example, $A^+B^-$ wherein $A^+$ is an alkali metal cation such as $Li^+$, $Na^+$, $K^+$, or combinations thereof and $B^-$ is an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$, or combinations thereof, and the organic solvent including, but is not limited to, propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), γ-butyrolactone, or mixtures thereof.

In the present disclosure, pouring of the electrolyte solution may be performed in any suitable step of a process for fabricating an electrochemical device based on a manufacturing process and required physical properties of a final product. That is, the pouring of the electrolyte solution may be applied before assembly of an electrochemical device or in the final step of assembly of an electrochemical device. Also, because the electrode according to the present disclosure is an integrated type of a separator and an electrode, a separator conventionally used is not necessarily required, but the electrode having the coating layer according to the present disclosure may be assembled with a polyolefin-based miroporous separator based on the purpose of use and characteristics of a final electrochemical device. The electrochemical device manufactured by the above method is preferably a lithium secondary battery, the lithium secondary battery includes a lithium metal secondary battery, a lithium ion secondary battery, a lithium polymer secondary battery, or a lithium ion polymer secondary battery.

Hereinafter, the present disclosure will be described in detail through examples to help understanding. The embodiments of the present disclosure, however, may take several other forms, and the scope of the present disclosure should not be construed as being limited to the following examples. The embodiments of the present disclosure are provided to more fully explain the present disclosure to those having ordinary knowledge in the art to which the present disclosure pertains.

EXAMPLES

<Manufacture of Electrode Including Insulating Layer>
Embodiment Example 1
Manufacture of Slurry for Insulating Layer Based on 100 parts by weight of alumina ($Al_2O_3$) powder, 2 parts by weight of sodium carboxyl methyl cellulose (CMC), and 4 parts by weight of styrene-butadiene rubber (SBR) were added to distilled water ($H_2O$) as a solvent, mixed, and dissolved for about 12 hours or longer, to prepare a polymer solution. A ball mill method was performed on the polymer solution for 12 hours or longer to pulverize and disperse the alumina powder, to prepare a slurry for an insulating layer.

Manufacture of Slurry for Anode Active Material 96 wt % of carbon powder as an anode active material, 3 wt % of CMC-SBR as a binder, and 1 wt % of carbon black as a conductive material were added to distilled water ($H_2O$) as a solvent, to prepare a slurry for an anode active material.

Manufacture of Slurry for Cathode Active Material 92 wt % of lithium cobalt composite oxide ($LiCoO_2$) as a cathode active material, 4 wt % of carbon black as a conductive material, and 4 wt % of CMC-SBR as a binder were added to N-methyl-2 pyrrolidone (NMP) as a solvent, to prepare a slurry for a cathode active material.

Manufacture of Electrode Including Insulating Layer

As shown in FIG. 1, a 15 µm thick copper current collector was placed on a bottom surface, and the slurry for an anode active material layer was coated on the copper current collector and dried. In this instance, the temperature of the bottom surface was 100° C. The coating was performed on a heated roller through a slot die, followed by drying. In this instance, the temperature of the roller was 120° C. A thickness and an average air permeability of the dried slurry for an insulating layer were 25 μm and 350 sec/100 ml (Gurley number), respectively. The two slurries were dried, and by the rolling of the heated roller and the bottom surface, the dried slurry for an insulating layer was transferred onto the dried slurry for an anode active material layer, and the two dried slurries were compressed together, to manufacture an anode structure in which the insulating layer and the anode active material layer were integratedly formed. In this instance, a distance between the heated roller and the bottom surface was 100 μm.

Also, similarly, a cathode structure was manufactured using a 15 μm thick aluminum current collector and the slurry for a cathode active material.

<Manufacture of Secondary Battery>

The coated anode and the coated cathode manufactured as described above were assembled using a stacking method, and a general polyolefin-based separator was not separately used. An electrolyte solution (ethylene carbonate (EC)/propylene carbonate (PC)/diethyl carbonate (DEC))=30/20/50 wt %, 1 mol lithium hexafluorophosphate (LiPF6)) was poured into the assembled battery, to manufacture a battery.

<Experimental Example>

Surface Observation of Separator

Figure 4:
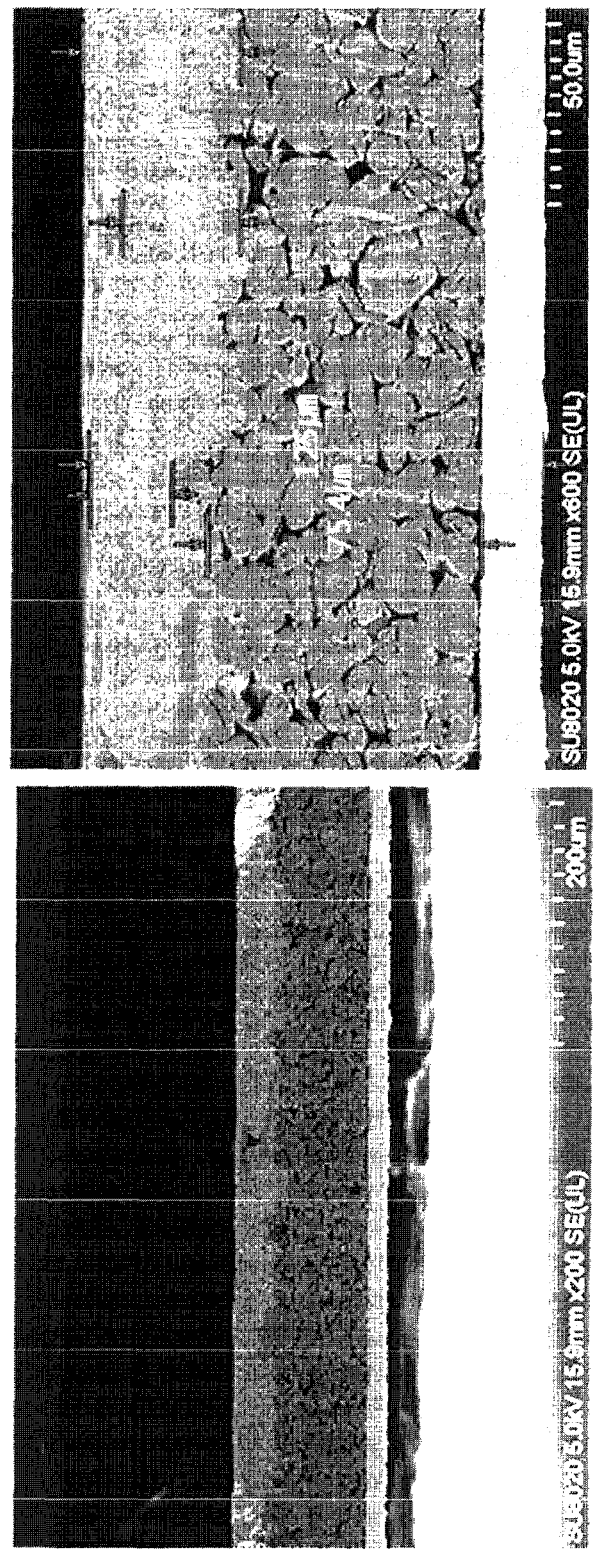
FIG. 4 is a scanning electron microscope (SEM) image showing a cross sectional structure of an electrode structure including an insulating layer according to the present disclosure.
Figure 5:
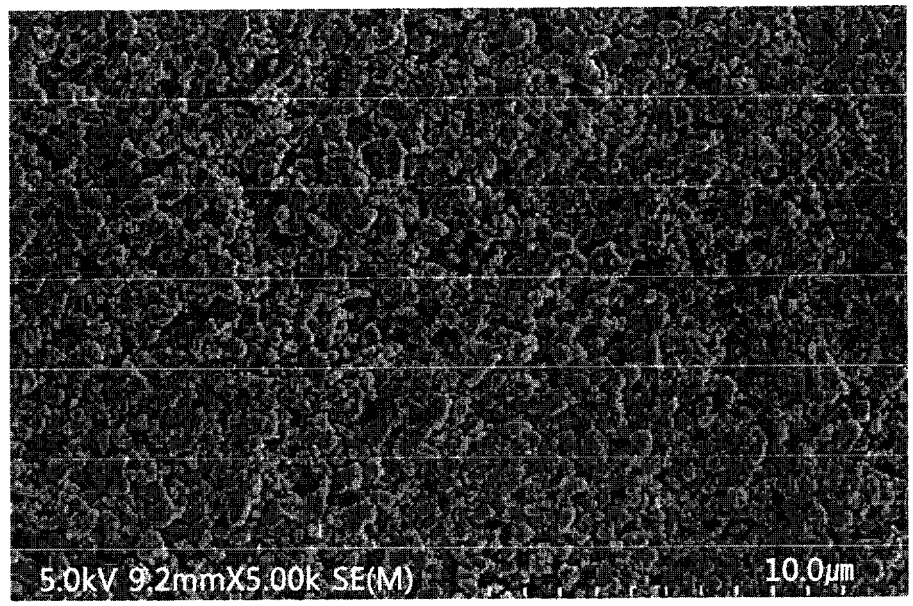
FIG. 5 is an SEM image showing a surface of an electrode structure including an insulating layer according to the present disclosure.

The electrode of the lithium secondary battery according to Embodiment example 1 was observed by scanning electron microscope (SEM), and SEM image according to Embodiment example were shown in FIGS. 4 and 5.

It can be seen that the electrode according to the present disclosure has the electrode active material particles and the insulating layer present in a tangled state (see FIG. 4), and a uniform pore structure is formed by interstitial volumes among the inorganic particles (see FIG. 5).

DETAILED DESCRIPTION OF REFERENCE NUMERALS

10—Electrode current collector
20—Slurry for an electrode active material layer
30—Slurry for an insulating layer
40—Porous substrate
21—Electrode active material
31—Inorganic particle
100, 300—Heated roller
101—Slot die
200—Heated bottom surface

What is claimed is:

1. A method for manufacturing an electrode structure, comprising:
   (S1) coating and drying a slurry for an electrode active material layer on an electrode current collector placed on a heated bottom surface;
   (S2) coating and drying a slurry for an insulating layer including inorganic particles, a binder, and a solvent, on a heated roller located at a predetermined distance from the bottom surface to form a dried slurry dry product for the insulating layer; and
   (S3) transferring the dried slurry dry product for the insulating layer to the dried slurry for the electrode active material layer on the bottom surface, and thermo-compressing the dried slurry dry product for the insulating layer and the dried slurry for the electrode active material layer, to form an insulating layer on an electrode surface.

2. The method for manufacturing the electrode structure according to claim 1, wherein when thermo-compressing the dried slurry dry product for the insulating layer and the dried slurry for the electrode active material layer, a porous substrate is interposed between the dried slurry dry product for the insulating layer and the dried slurry for the electrode active material layer.

3. The method for manufacturing the electrode structure according to claim 1, wherein a temperature of the heated bottom surface is from 40 to 200° C.

4. The method for manufacturing the electrode structure according to claim 1, wherein a temperature of the heated roller is from 40 to 200° C.

5. The method for manufacturing the electrode structure according to claim 1, wherein a distance between the heated bottom surface and the heated roller is from 0.01 to 10 mm.

6. The method for manufacturing the electrode structure according to claim 1, wherein a pressing condition for the thermo-compression is from 1 to 500 kgf/cm$^2$.

7. The method for manufacturing the electrode structure according to claim 1, wherein the bottom surface is a surface of a belt connected to a transfer means.

8. The method for manufacturing the electrode structure according to claim 1, wherein the solvent is any one solvent selected from the group consisting of acetone, tetrahydrofuran, methylene chloride, chloroform, dimethylformamide, dimethylacetamide, hexamethylphosphoamide, acetonitrile, cyclohexanone, N-methyl-2-pyrrolidone (NMP), cyclohexane, and water (distilled water), or mixtures thereof.

9. The method for manufacturing the electrode structure according to claim 1, wherein the binder is any one binder polymer selected from the group consisting of polyvinylidene fluoride-co-hexafluoropropylene, polyvinylidene fluoride-co-trichloroethylene, polymethylmethacrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose (CMC), and styrene-butadiene rubber (SBR), or mixtures thereof.

10. The method for manufacturing the electrode structure according to claim 1, wherein a thickness of the thermo-compressed insulating layer is from 1 to 100 μm.

11. The method for manufacturing the electrode structure according to claim 1, wherein an average grain diameter of the inorganic particles is from 0.001 to 10 μm.

12. The method for manufacturing the electrode structure according to claim 1, wherein a weight ratio of the inorganic particles and the binder polymer is from 50:50 to 99:1.

13. The method for manufacturing the electrode structure according to claim 1, wherein a thickness of the thermo-compressed electrode active material layer is from 0.5 to 200 μm.

14. The method for manufacturing the electrode structure according to claim 1, wherein an electrode active material included in the slurry for the electrode active material layer is a cathode active material, and the electrode structure is a cathode structure.

15. The method for manufacturing the electrode structure according to claim 1, wherein an electrode active material included in the slurry for the electrode active material layer is an anode active material, and the electrode structure is an anode structure.

* * * * *